United States Patent
Bakshi et al.

(10) Patent No.: US 10,545,859 B2
(45) Date of Patent: Jan. 28, 2020

(54) METHOD AND SYSTEM FOR MULTI-CHANNEL TESTING

(71) Applicant: Webomates LLC, Wilmington, DE (US)

(72) Inventors: Aseem Bakshi, Darien, CT (US); Ruchika Gupta, Norwalk, CT (US); Mark Sawers, Fairfield, CT (US)

(73) Assignee: WEBOMATES LLC, Wilmington, DE (US)

( * ) Notice: Subject to any disclaimer, the term of this patent is extended or adjusted under 35 U.S.C. 154(b) by 166 days.

(21) Appl. No.: 15/888,949

(22) Filed: Feb. 5, 2018

(65) Prior Publication Data

US 2019/0243752 A1 Aug. 8, 2019

(51) Int. Cl.
G06F 11/36 (2006.01)

(52) U.S. Cl.
CPC ...... *G06F 11/3692* (2013.01); *G06F 11/3684* (2013.01); *G06F 11/3688* (2013.01)

(58) Field of Classification Search
CPC .......................... G06F 11/3684; G06F 11/3692
USPC ....................................................... 714/38.1
See application file for complete search history.

(56) References Cited

U.S. PATENT DOCUMENTS

| | | | |
|---|---|---|---|
| 8,479,164 B2 | 7/2013 | Becker et al. | |
| 9,201,776 B1 * | 12/2015 | Cohen | G06F 9/44589 |
| 9,218,261 B2 | 12/2015 | Holden | |
| 9,268,672 B1 * | 2/2016 | Gupta | G06F 11/3684 |
| 9,348,735 B1 * | 5/2016 | Cohen | G06F 11/3684 |
| 2003/0028856 A1 * | 2/2003 | Apuzzo | G06F 11/3684 717/124 |
| 2010/0180260 A1 | 7/2010 | Chikkadevaiah et al. | |
| 2012/0198280 A1 * | 8/2012 | Cao | G06F 11/3684 714/32 |
| 2012/0253728 A1 | 10/2012 | Chamas et al. | |
| 2014/0040867 A1 * | 2/2014 | Wefers | G06F 11/3684 717/131 |

(Continued)

OTHER PUBLICATIONS

Ramler et al. 2006. Economic perspectives in test automation: balancing automated and manual testing with opportunity cost. In Proceedings of the 2006 international workshop on Automation of software test (AST '06). ACM, New York, NY, USA, 85-91. (Year: 2006).*

(Continued)

*Primary Examiner* — Chae M Ko
(74) *Attorney, Agent, or Firm* — HM Law Group LLP; Vanintheran Moodley, Esq.

(57) ABSTRACT

Disclosed is a system and method for multi-channel testing of a software application is disclosed. The system may generate a set of test case definitions for testing a software application. The system may further allocate a sub-set of test case definitions, from the set of test cases definitions, to each test execution channel from the set of test execution channels based on a set of execution parameters specified by a user and the primary execution channel as well as the secondary execution channel associated with each test case definition. Furthermore, using the test case definitions associated with each test case execution channel, the system may enable testing of the software application at respective test execution channels and accordingly report the test execution results to the user.

13 Claims, 4 Drawing Sheets

(56) References Cited

U.S. PATENT DOCUMENTS

| | | | |
|---|---|---|---|
| 2014/0282433 A1* | 9/2014 | Eilam ................. | G06F 11/3688 |
| | | | 717/131 |
| 2016/0117239 A1* | 4/2016 | Hamilton, II ....... | G06F 11/3684 |
| | | | 717/124 |
| 2016/0283358 A1* | 9/2016 | Mallya ................ | G06F 11/3684 |
| 2019/0179734 A1* | 6/2019 | Nupponen .......... | G06F 11/3684 |

OTHER PUBLICATIONS

Leitner el al, "Reconciling Manual and Automated Testing: The AutoTest Experience," 2007 40th Annual Hawaii International Conference on System Sciences (HICSS'07), Waikoloa, HI, 2007, pp. 261a-261a. (Year: 2007).*

* cited by examiner

METHOD AND SYSTEM FOR MULTI-CHANNEL TESTING

PRIORITY INFORMATION

This patent application does not claim priority from any application.

TECHNICAL FIELD

The present subject matter described herein, in general, relates to the field of software testing, and more particularly to a system and method for testing an application using multiple test execution channel/testing methodologies.

BACKGROUND

In the field of software testing, different software testing methodologies/(test case execution channels) are used. These test case execution channels may include manual testing, automation testing, semi-automated testing, crowd-source testing, Artificial Intelligence based testing and alike. However, none of the software testing methodology is perfect. Each software testing methodology has some advantages and disadvantages.

In the software industry, manual testing is mostly used for testing but the manual testing process is labor intensive, slow time to execute, difficult to scale, error prone, requires high management overhead, costly, and low fragility. Furthermore, automation testing appears as a cure to all the ills of manual testing. Automation testing on the other hand is characterized by more expensive talent (developers not QA), higher upfront costs, fast time to execute, high fragility (tendency of the tests to fail with minimal change). Many companies have tried to achieve 80 to 90% automation, which is very difficult to create and almost impossible to maintain. Furthermore, AI based testing is largely dependent on the robustness of the set of software testing examples used for training the bot used in AI based testing. The process of training the bot, for software testing, requires extensive effort. If the bot is not trained appropriately, the bot's efficacy is poor and leads to frequent false positives or false negatives test results. The latest innovation is crowd-source testing that has external low cost low quality talent doing the tests. As these are not trained QA professionals, far more documentation is needed. Hence, each of the software testing methodology available in the art have some advantages and disadvantages. In such a situation, it is very difficult to determine, which software testing methodology should be used for a particular software application in order to perform the software testing in a better and efficient manner.

To address the above issues, a combination of test execution methodologies may be used. However, it must be noted that each testing methodology is different and requires a completely different set of test cases to test the same functionality of an application using different test execution methodologies. As a result, for testing features associated with a software application using multiple testing methodologies, a test case corresponding to each testing methodology needs to be designed. Currently there are no means by which, a single test case definition can be used across multiple testing methodologies.

SUMMARY

Before the present systems and methods for multi-channel testing of software applications are described, it is to be understood that this application is not limited to the particular systems, and methodologies described, as there can be multiple possible embodiments, which are not expressly illustrated in the present disclosure. It is also to be understood that the terminology used in the description is for the purpose of describing the particular versions or embodiments only, and is not intended to limit the scope of the present application. This summary is provided to introduce concepts related to systems and methods for multichannel testing of software applications and the concepts are further described below in the detailed description. This summary is not intended to identify essential features of the claimed subject matter nor is it intended for use in determining or limiting the scope of the claimed subject matter.

In one implementation, a system for multi-channel testing of software application is disclosed. The system may comprise a processor and a memory coupled to the processor. The processor may execute program instructions stored in the memory. The processor may execute program instructions stored in the memory for generating a set of test case definitions for testing a software application. In one embodiment, each test cases definition is compatible with each test execution channel from a set of test execution channels. Furthermore, each test case definition is assigned with a primary execution channel and a secondary execution channel based on the nature of the test case definition. The processor may further execute program instructions stored in the memory for allocating a sub-set of test case definitions, from the set of test cases definitions, to each test execution channel from the set of test execution channels based on a set of execution parameters specified by a user and the primary execution channel as well as the secondary execution channel associated with each test case definition. The processor may further execute program instructions stored in the memory for generating a set of test cases corresponding to each of the sub-set of test case definitions based on the test execution channel associated with each on the sub-set of test case definitions. The processor may further execute program instructions stored in the memory for performing a test execution cycle to classify the set of test cases into passed test cases and failed test cases based on execution of each set of test cases at the corresponding test case execution channel In one embodiment, the execution of each set of test cases at the corresponding test execution channel is performed in parallel. The processor may further execute program instructions stored in the memory for determining a final execution status of the failed test cases by re-executing the failed test cases over one or more test execution channels from the set of test execution channels. In one embodiment, the one or more test execution channels are determined based on the primary execution channel and the secondary execution channel associated therewith. The processor may further execute program instructions stored in the memory for generating a combined test execution report based on the test execution cycle and final execution status of the failed test cases. The combined test execution report is generated in real-time, wherein each test execution channel is associated with a standardized reporting methodology, and wherein the standardized reporting methodology enables combining execution results from the set of test execution channels to generate the combined test execution report.

In another implementation, a method for multi-channel testing of software application is disclosed. The method may comprise steps of generating a set of test case definitions for testing a software application. In one embodiment, each test cases definition is compatible with each test execution channel from a set of test execution channels. Furthermore, each test case definition may be assigned with a primary execution channel and a secondary execution channel based on the nature of the test case definition. The method may further comprise steps of allocating a sub-set of test case definitions, from the set of test cases definitions, to each test execution channel from the set of test execution channels based on a set of execution parameters specified by a user and the primary execution channel as well as the secondary execution channel associated with each test case definition. The method may further comprise steps of generating a set of test cases corresponding to each of the sub-set of test case definitions based on the test execution channel associated with each on the sub-set of test case definitions. The method may further comprise steps of performing a test execution cycle to classify the set of test cases into passed test cases and failed test cases based on execution of each set of test cases at the corresponding test case execution channel In one embodiment, the execution of each set of test cases at the corresponding test execution channel is performed in parallel. The method may further comprise steps of determining a final execution status of the failed test cases by re-executing the failed test cases over one or more test execution channels from the set of test execution channels. In one embodiment, the one or more test execution channels are determined based on the primary execution channel and the secondary execution channel associated therewith. The method may further comprise steps of generating a combined test execution report based on the test execution cycle and final execution status of the failed test cases. The combined test execution report is generated in real-time, wherein each test execution channel is associated with a standardized reporting methodology, and wherein the standardized reporting methodology enables combining execution results from the set of test execution channels to generate the combined test execution report.

In yet another implementation, non-transitory computer readable medium embodying a program executable in a computing device for multi-channel testing of software application is disclosed. The program may comprise a program code for generating a set of test case definitions for testing a software application. In one embodiment, each test cases definition is compatible with each test execution channel from a set of test execution channels. Furthermore, each test case definition may be assigned with a primary execution channel and a secondary execution channel based on the nature of the test case definition. The program may comprise a program code for allocating a sub-set of test case definitions, from the set of test cases definitions, to each test execution channel from the set of test execution channels based on a set of execution parameters specified by a user and the primary execution channel as well as the secondary execution channel associated with each test case definition. The program may comprise a program code for generating a set of test cases corresponding to each of the sub-set of test case definitions based on the test execution channel associated with each on the sub-set of test case definitions. The program may comprise a program code for performing a test execution cycle to classify the set of test cases into passed test cases and failed test cases based on execution of each set of test cases at the corresponding test case execution channel. In one embodiment, the execution of each set of test cases at the corresponding test execution channel is performed in parallel. The program may comprise a program code for determining a final execution status of the failed test cases by re-executing the failed test cases over one or more test execution channels from the set of test execution channels. In one embodiment, the one or more test execution channels are determined based on the primary execution channel and the secondary execution channel associated therewith. The program may comprise a program code for generating a combined test execution report based on the test execution cycle and final execution status of the failed test cases. The combined test execution report is generated in real-time, wherein each test execution channel is associated with a standardized reporting methodology, and wherein the standardized reporting methodology enables combining execution results from the set of test execution channels to generate the combined test execution report.

BRIEF DESCRIPTION OF THE DRAWINGS

The foregoing detailed description of embodiments is better understood when read in conjunction with the appended drawings. For the purpose of illustrating the disclosure, example constructions of the disclosure is shown in the present document. However, the disclosure is not limited to the specific methods and apparatus disclosed in the document and the drawings.

The detailed description is given with reference to the accompanying figures. In the figures, the left-most digit(s) of a reference number identifies the figure in which, the reference number first appears. The same numbers are used throughout the drawings to refer like features and components.

DETAILED DESCRIPTION

Some embodiments of this disclosure, illustrating all its features, will now be discussed in detail. The words "allocating," "generating," "performing," "determining," and other forms thereof, are intended to be equivalent in meaning and be open ended in that an item or items following any one of these words is not meant to be an exhaustive listing of such item or items, or meant to be limited to only the listed item or items. It must also be noted that as used herein and in the appended claims, the singular forms "a," "an," and "the" include plural references unless the context clearly dictates otherwise. Although any systems and methods similar or equivalent to those described herein can be used in the practice or testing of embodiments of the present disclosure, the exemplary, systems and methods are now described. The disclosed embodiments are merely exemplary of the disclosure, which may be embodied in various forms.

Various modifications to the embodiment will be readily apparent to those skilled in the art and the generic principles herein may be applied to other embodiments. However, one of ordinary skill in the art will readily recognize that the present disclosure is not intended to be limited to the embodiments illustrated, but is to be accorded the widest scope consistent with the principles and features described herein.

In one embodiment, a system for performing Multi-channel testing of software application is disclosed. The system enables test case execution using multiple testing methods (manual testing, crowdsourcing or amateur manual testing, automation testing, Artificial Intelligence based testing and alike). Each method of testing is referred to as a test case execution channel. Multiple test case execution channels provide the benefit of achieving a fixed test execution time requirement, repeatedly even with variation in the software application under testing and availability of resources. The system enables uniformity in test execution cycle using normalization of test case design, synchronization of execution, auditing for quality and reporting results in a consistent manner. The network implementation of the system for executing the test cases using multiple test execution channels is further elaborated with respect to the block diagram of FIG. 1.

While aspects of described system and method for multi-channel testing of software applications may be implemented in any number of different computing systems, environments, and/or configurations, the embodiments are described in the context of the following exemplary system.

Figure 1:
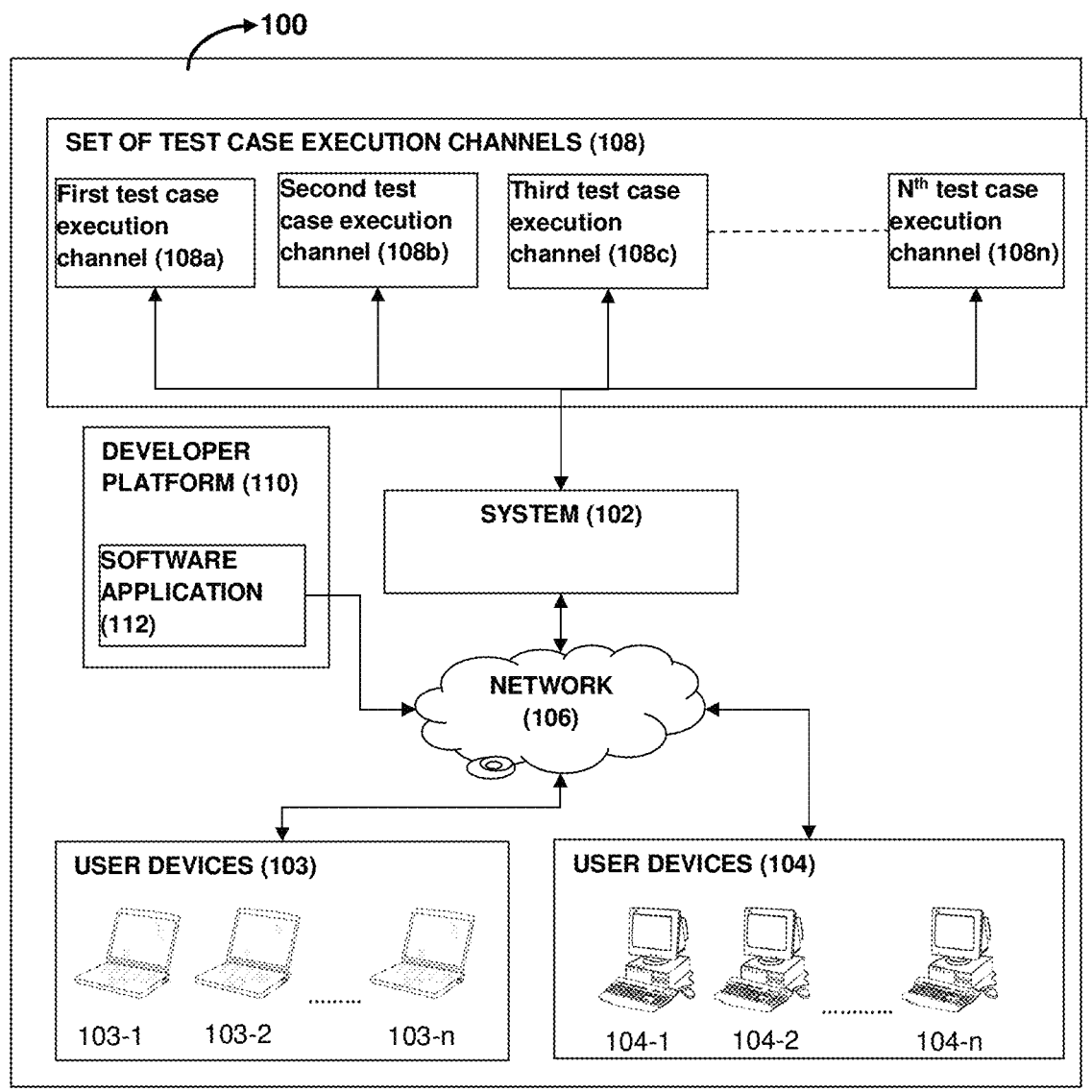
FIG. 1 illustrates a network implementation of a system for multi-channel testing of a software application, in accordance with an embodiment of the present subject matter.

Referring now to FIG. 1, a network implementation 100 of a system 102 for multi-channel testing of a software application is disclosed. The system 102 may be connected to one or more user devices 104, a software developer platform 108, and a set of test case execution channels 110.

Although the present disclosure is explained considering that the system 102 is implemented on a server, it may be understood that the system 102 may be implemented in a variety of computing systems, such as a laptop computer, a desktop computer, a notebook, a workstation, a mainframe computer, a server, a network server, a cloud-based computing environment. It will be understood that the system 102 may be accessed by multiple regular application users and software testers. The regular application users may access the system 102 through one or more application user devices 103-1, 103-2 . . . , 103-n. Further, the software tester may access the system 102 through one or more user devices 104-1, 104-2 . . . 104-N, collectively referred to as user device 104. In one implementation, the system 102 may comprise the cloud-based computing environment in which a user may operate individual computing systems configured to execute remotely located applications. Examples of the user devices 104 may include, but are not limited to, a portable computer, a personal digital assistant, a handheld device, and a workstation. The user devices 104 are communicatively coupled to the system 102 through a network 106.

In one implementation, the network 106 may be a wireless network, a wired network or a combination thereof. The network 106 can be implemented as one of the different types of networks, such as intranet, local area network (LAN), wide area network (WAN), the internet, and the like. The network 106 may either be a dedicated network or a shared network. The shared network represents an association of the different types of networks that use a variety of protocols, for example, Hypertext Transfer Protocol (HTTP), Transmission Control Protocol/Internet Protocol (TCP/IP), Wireless Application Protocol (WAP), and the like, to communicate with one another. Further, the network 106 may include a variety of network devices, including routers, bridges, servers, computing devices, storage devices, and the like.

In one embodiment, the software developer platform 108 may enable software developers to develop an application/computer program hereinafter referred as a software application 112. Once the software application 112 is developed, in the next step the software application 112 may be received/accessed through the system 102 for the purpose of testing the software application 112. The software application 112 may be accessed remotely by the system 106 through the network 106 for testing the software application 112 using multiple test case execution channels 110. The process of testing the software application 112 using multiple test case execution channels 110 is further elaborated with respect to the FIG. 2.

Figure 2:
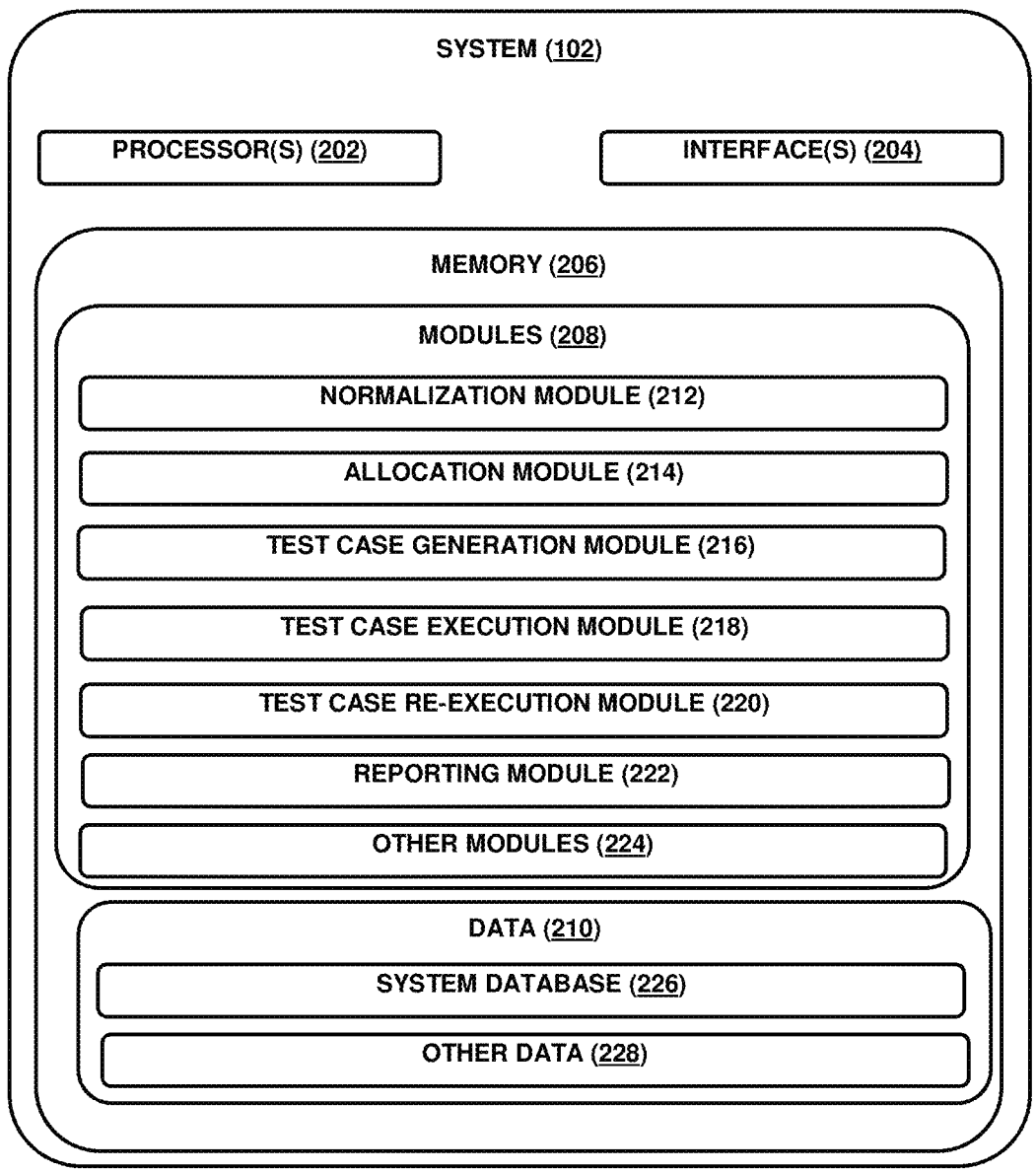
FIG. 2 illustrates the system, in accordance with an embodiment of the present subject matter.

Referring now to FIG. 2, the system 102 is illustrated in accordance with an embodiment of the present subject matter. In one embodiment, the system 102 may include at least one processor 202, an input/output (I/O) interface 204, and a memory 206. The at least one processor 202 may be implemented as one or more microprocessors, microcomputers, microcontrollers, digital signal processors, central processing units, state machines, logic circuitries, and/or any devices that manipulate signals based on operational instructions. Among other capabilities, the at least one processor 202 is configured to fetch and execute computer-readable instructions stored in the memory 206.

The I/O interface 204 may include a variety of software and hardware interfaces, for example, a web interface, a graphical user interface, and the like. The I/O interface 204 may allow the system 102 to interact with the user directly or through the client devices 104. Further, the I/O interface 204 may enable the system 102 to communicate with other computing devices, such as web servers and external data servers (not shown). The I/O interface 204 can facilitate multiple communications within a wide variety of networks and protocol types, including wired networks, for example, LAN, cable, etc., and wireless networks, such as WLAN, cellular, or satellite. The I/O interface 204 may include one or more ports for connecting a number of devices to one another or to another server.

The memory 206 may include any computer-readable medium or computer program product known in the art including, for example, volatile memory, such as static random access memory (SRAM) and dynamic random access memory (DRAM), and/or non-volatile memory, such as read only memory (ROM), erasable programmable ROM, flash memories, hard disks, optical disks, and magnetic tapes. The memory 206 may include modules 208 and data 210.

The modules 208 include routines, programs, objects, components, data structures, etc., which perform particular tasks or implement particular abstract data types. In one implementation, the modules 208 may include a normalization module 212, an allocation module 214, a test case generation module 216, a test case execution module 218, a test case re-execution module 220, a reporting module 222, and other modules 224. The other modules 222 may include programs or coded instructions that supplement applications and functions of the system 102. The modules 208 described herein may be implemented as software modules that may be executed in the cloud-based computing environment of the system 102.

The data 210, amongst other things, serves as a repository for storing data processed, received, and generated by one or more of the modules 208. The data 210 may also include a system database 226 and other data 228. The other data 228 may include data generated because of the execution of one or more modules in the other modules 224.

As there are various challenges observed in the existing art, the challenges necessitate the need to build the system 102 for testing the software application 112 using the set of test case execution channels 108. In one embodiment, the software program 112 may correspond to at least one of a web page, a software code, a software application, SAAS, PAAS, a mobile application, and alike. In order to test the software application 112, initially, the software program 112 may be deployed at the system 102. Further, a user (hereinafter may also referred to as a software tester) may use the client device 104 to access the system 102 via the I/O interface 204. The user may register them using the I/O interface 204 in order to use the system 102. The system 102 may employ the normalization module 212, an allocation module 214, a test case generation module 216, a test case execution module 218, a test case re-execution module 220, and a reporting module 222. The detail functioning of the modules is described below with the help of figures.

In one embodiment, the normalization module 212 may enable a tester to access the system 102 using the user devices 104 and submit one or more test cases definitions for testing the software application 112. For generating the set of test case definitions, the tester may analyze the software application 112 and provide inputs to the normalization module 212 based on his analysis. In one embodiment, the tester may manually generate the set of test case definitions and submit the set of test case definitions to the system 102. Further, the normalization module 212 may be configured to validate the test case definitions submitted by the tester based on predefined rules and parameters. In one embodiment, once the tester inputs are received, the normalization module 212 may be configured to automatically generate the set of test case definitions by applying Artificial Intelligence Algorithms and Natural language processing (NLP) on the tester inputs. In one embodiment, each test case definition may be associated with a set of characteristics. The set of characteristics may comprise consistent granularity, communicability, comprehensiveness, transformable from one test execution channel to another, and measurability. The one or more test cases definitions may be normalized such that each test case definition may be used in order to generate a test case corresponding to each test case execution channel from a set of test case execution channels 108. For example, using the same test case definition, a user may generate a manual test case, an automated test case, or a crowd source test case since each test case definition is consistent across all the channels. In one embodiment, the set of test case execution channels 108 may include manual testing channel, automated testing channel, crowdsource testing channel, Artificial Intelligence based testing channel and alike. Furthermore, each test case definition may be associated with a primary execution channel and a secondary execution channel. The primary execution channel is the most preferred testing methodology to be used for execution the test case whereas the secondary execution channel may be considered for execution the test case if the primary execution channel is not available or fails to execute the test case. In one example, for a test case one, the primary execution channel may be manual testing channel and secondary execution channel may be automated testing channel. In another example, for test case two, the primary execution channel may be automated testing and secondary execution channel may be crowdsourcing. As a result, based on the characteristics of each test case, the primary and secondary execution channel may be assigned to each test case definition.

Furthermore, the classification module 214 may be configured to allocate a sub-set of test case definitions, from the set of test cases definitions, to each test execution channel from the set of test execution channels based on a set of execution parameters specified by the user (tester), and the primary execution channel and the secondary execution channel associated with each test case definition. The set of execution parameters specify one or more preferred test execution channels to be used in order to timely complete the test execution cycle. For example, if we consider 100 test case definitions and the execution time allotted for completing the entire testing cycle is 10 hrs. In this case, the classification module 214 may analyze the set of execution parameters associated with each channel 108 and accordingly divide the test case definitions into 25 for manual testing, 25 for crowdsource testing and the remaining 50 for automated testing.

In one embodiment, the timely completion of the execution cycle is further enabled by real time monitoring of the test execution cycle to identify one or more hurdles in timely completion of the test execution cycle and removing the one or more hurdles by re-execution, restarting infrastructure, republishing, and reward changes. For example, if it is identified that only 5 test case definitions out of the 25 test case definitions allocated to the manual testing channel are getting executed due to lack of resources. In such a situation, the classification module 214 may further be configured to reassign the remaining 20 manual test case definitions to crowdsourcing. Furthermore, the classification module 214 may be configured to aggregate or disaggregate the test cases dependent on the set of execution parameters associated with the test execution channels. In one example, the set of execution parameters may correspond to cost, performance, and efficiency of the test execution channel. The set of execution parameters may be analyzed with respect to the test requirements in order to assign each subset of test case definitions to the set of test case execution channels 108.

Once the assigning of test case definitions is complete, in the next step, the test case generation module 216 is configured to generate a set of test cases corresponding to each of the sub-set of test case definitions based on the test execution channel associated with each on the sub-set of test case definitions. In another embodiment, the test case generation module 216 may enable the tester to generate the set of test cases using the test case definitions. The test cases are configured to perform one or more software testing activities from a set of software testing activities. In one embodiment, the set of software testing activities may comprise functional, performance, security, and usability testing of a software application.

Further, the test case execution module 218 is configured to perform a test execution cycle at each test case execution channel using the corresponding set of test cases and classify the set of test cases into passed test cases and failed test cases based on execution of each set of test cases at the corresponding test case execution channel. In one embodiment, the execution of each set of test cases at the corresponding test execution channel is performed in parallel. In other words, the execution cycle is synchronized such that test cases execution cycle corresponding to each channel is performed at the same time. In one embodiment, a single test case definition may be assigned to multiple test case execution channels. Further, the execution results from the one or more test execution channels is analyzed to classify the test case into passed test case or failed test case. In one embodiment, each test cases definition is associated with a predefined weightage and a predefined size. The predefined weightage and the predefined size are consistent across the set of test execution channels. Furthermore, the predefined weightage and the predefined size is directly proportional to a number of validation points associated with the test cases definition. Furthermore, the execution results from set of test execution channels are combined using the predefined weightage and the predefined size for each test case definition.

Further, the test case re-execution module 220 is configured to determine a final execution status of the failed test cases by re-executing the failed test cases over one or more test execution channels from the set of test execution channels 108. In one embodiment, the one or more test execution channels are determined based on the primary execution channel and the secondary execution channel associated with the test case definition.

Finally, the reporting module 222 is configured to generate a combined test execution report based on the test execution cycle, final execution status of the failed test cases, predefined weightage, and the predefined size for each test case definitions. The combined test execution report is generated in real-time. In one embodiment, each test execution channel is associated with a standardized reporting methodology, which enables combining execution results from the set of test execution channels to generate the combined test execution report.

In one embodiment, the test execution results are collected from all channels and rendered in both detail and aggregate metrics in a test monitoring application and in paginated document form that may be emailed or printed. Furthermore, the reporting module 222 is configured to display per test case information with expected vs actual data, detailed instructions to recreate any defects, screenshots and or video, and execution time. The reporting module 222 may also generate report to demonstrate test progress during the execution and after completion. Furthermore, metrics representing test case count, percentage executed, passed and failed may also be generated by the reporting module 222. The metrics information may be displayed graphically, such as in bar and pie charts, and optionally compared to past run metrics. These metrics may be further computed on a per-channel basis, as well as application area. The expected completion time is computed initially by averaging the most recent runs if available. After a certain threshold of test case completion per channel (ex. ten percent) the average time per test case is multiplied by the remaining test cases of the respective channel. Further, the differentiation of current run vs average of the last five may also be computed.

Figure 3:
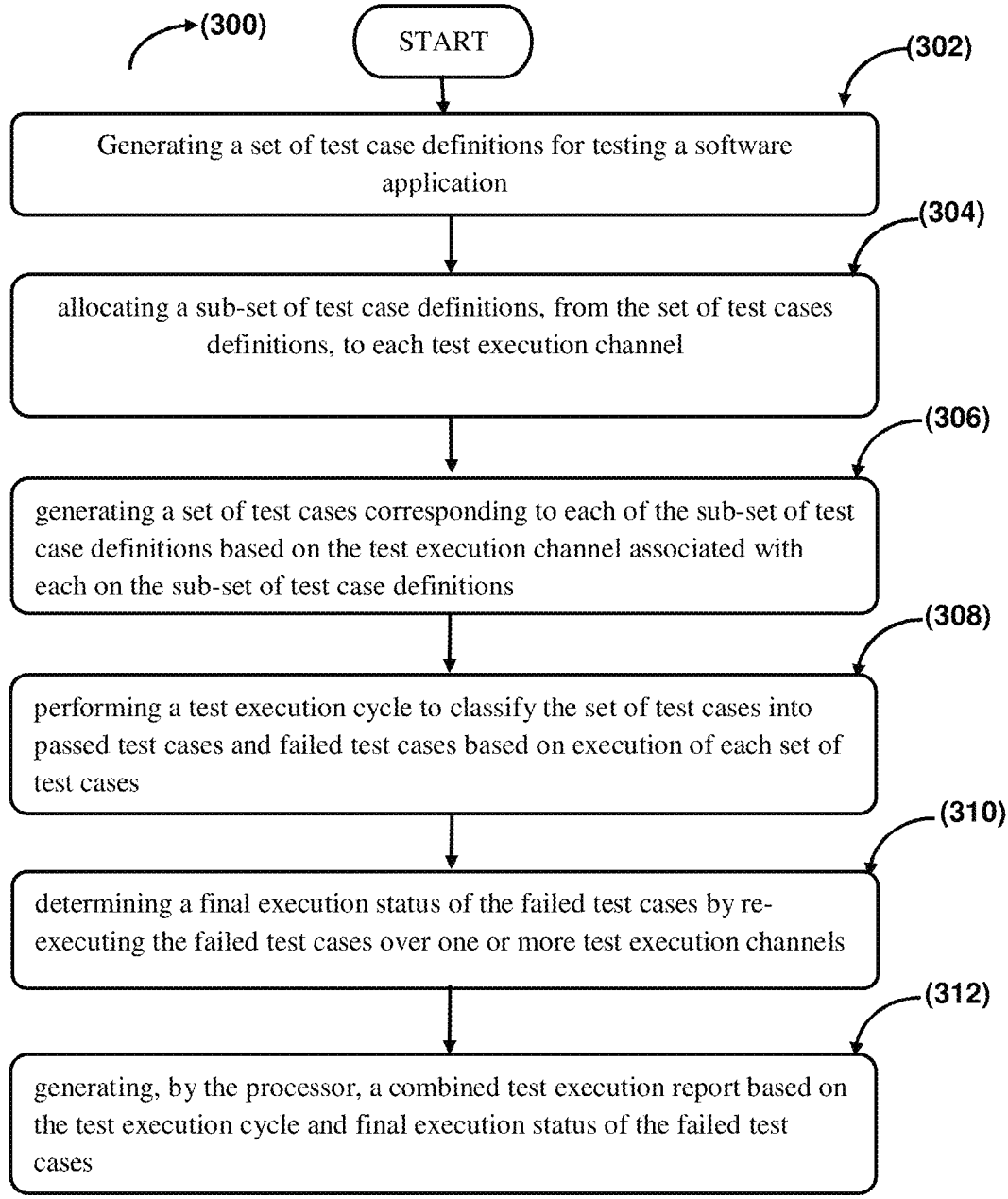
FIG. 3 illustrates a method for multi-channel testing of the software application, in accordance with an embodiment of the present subject matter.

Referring now to FIG. 3, a method 300 for multi-channel testing of software application is illustrated, in accordance with an embodiment of the present subject matter. The method 300 may be described in the general context of computer executable instructions. Generally, computer executable instructions can include routines, programs, objects, components, data structures, procedures, modules, functions, etc., that perform particular functions or implement particular abstract data types. The method 300 may also be practiced in a distributed computing environment where functions are performed by remote processing devices that are linked through a communications network. In a distributed computing environment, computer executable instructions may be located in both local and remote computer storage media, including memory storage devices.

The order in which the method 300 is described is not intended to be construed as a limitation, and any number of the described method blocks can be combined in any order to implement the method 300 or alternate methods. Additionally, individual blocks may be deleted from the method 300 without departing from the spirit and scope of the subject matter described herein. Furthermore, the method may be implemented in any suitable hardware, software, firmware, or combination thereof. However, for ease of explanation, in the embodiments described below, the method 300 may be considered to be implemented as described in the system 102.

At block 302, the normalization module 212 may enable a tester to access the system 102 using the user devices 104 and submit one or more test cases definitions for testing the software application 112. For generating the set of test case definitions, the tester may analyze the software application 112 and provide inputs to the normalization module 212 based on his analysis. In one embodiment, the tester may manually generate test case definitions and submit the set of test case definitions to the system 102. Further, the normalization module 212 may be configured to validate the set of test case definitions submitted by the tester based on predefined rules and parameters. In one embodiment, once the tester inputs are received, the normalization module 212 may be configured to automatically generate the set of test case definitions by applying Artificial Intelligence Algorithms and Natural language processing (NLP) on the tester inputs. In one embodiment, each test case definition may be associated with a set of characteristics. The set of characteristics may comprise consistent granularity, communicability, comprehensiveness, transformable from one test execution channel to another, and measurability. The one or more test cases definitions may be normalized such that each test case definition may be used in order to generate a test case corresponding to each test case execution channel from a set of test case execution channels 108. For example, using the same test case definition, a user may generate a manual test case, an automated test case, or a crowd source test case since each test case definition is consistent across all the channels. In one embodiment, the set of test case execution channels 108 may include manual testing channel, automated testing channel, crowdsource testing channel, Artificial Intelligence based testing channel and alike. Furthermore, each test case definition may be associated with a primary execution channel and a secondary execution channel. The primary execution channel is the most preferred testing methodology to be used for execution the test case whereas the secondary execution channel may be considered for execution the test case if the primary execution channel is not available or fails to execute the test case. In one example, for a test case one, the primary execution channel may be manual testing channel and secondary execution channel may be automated testing channel. In another example, for test case two, the primary execution channel may be automated testing and secondary execution channel may be crowdsourcing. As a result, based on the characteristics of each test case, the primary and secondary execution channel may be assigned to each test case definition.

At block 304, the classification module 214 may be configured to allocate a sub-set of test case definitions, from the set of test cases definitions, to each test execution channel from the set of test execution channels based on a set of execution parameters specified by the user (tester), and the primary execution channel and the secondary execution channel associated with each test case definition. The set of execution parameters specify one or more preferred test execution channels to be used in order to timely complete the test execution cycle. For example, if we consider 100 test case definitions and the execution time allotted for completing the entire testing cycle is 10 hrs. In this case, the classification module 214 may analyze the set of execution parameters associated with each channel 108 and accordingly divide the test case definitions into 25 for manual testing, 25 for crowdsource testing and the remaining 50 for automated testing.

In one embodiment, the timely completion of the execution cycle is further enabled by real time monitoring of the test execution cycle to identify one or more hurdles in timely completion of the test execution cycle and removing the one or more hurdles by re-execution, restarting infrastructure, republishing, and reward changes. For example, if it is identified that only five test case definitions out of the 25 test case definitions allocated to the manual testing channel are being executed due to lack of resources. In such a situation, the classification module 214 may further be configured to reassign the remaining 20 manual test case definitions to crowdsourcing. Furthermore, the classification module 214 may be configured to aggregate or disaggregate the test cases dependent on the set of execution parameters associated with the test execution channels. In one example, the set of execution parameters may correspond to cost, performance, and efficiency of the test execution channel. The set of execution parameters may be analyzed with respect to the test requirements in order to assign each subset of test case definitions to the set of test case execution channels 108.

At block 306, once the assigning of test case definitions is complete, in the next step, the test case generation module 216 is configured to generate a set of test cases corresponding to each of the sub-set of test case definitions based on the test execution channel associated with each on the sub-set of test case definitions. In another embodiment, the test case generation module 216 may enable the tester to generate the set of test cases using the test case definitions. The test cases are configured to perform one or more software testing activities from a set of software testing activities. In one embodiment, the set of software testing activities may comprise functional, performance, security, and usability testing of a software application.

At block 308, the test case execution module 218 is configured to perform a test execution cycle at each test case execution channel using the corresponding set of test cases and classify the set of test cases into passed test cases and failed test cases based on execution of each set of test cases at the corresponding test case execution channel. In one embodiment, the execution of each set of test cases at the corresponding test execution channel is performed in parallel. In other words, the execution cycle is synchronized such that test cases execution cycle corresponding to each channel is performed at the same time. In one embodiment, a single test case definition may be assigned to multiple test case execution channels. Further, the execution results from the one or more test execution channels is analyzed to classify the test case into passed test case or failed test case. In one embodiment, each test cases definition is associated with a predefined weightage and a predefined size. The predefined weightage and the predefined size are consistent across the set of test execution channels. Furthermore, the predefined weightage and the predefined size is directly proportional to a number of validation points associated with the test cases definition. Furthermore, the execution results from set of test execution channels are combined using the predefined weightage and the predefined size for each test case definition.

At block 310, the test case re-execution module 220 is configured to determine a final execution status of the failed test cases by re-executing the failed test cases over one or more test execution channels from the set of test execution channels 108. In one embodiment, the one or more test execution channels are determined based on the primary execution channel and the secondary execution channel associated with the test case definition.

At block 312, the reporting module 222 is configured to generate a combined test execution report based on the test execution cycle, final execution status of the failed test cases, predefined weightage, and the predefined size for each test case definitions. The combined test execution report is generated in real-time. In one embodiment, each test execution channel is associated with a standardized reporting methodology, which enables combining execution results from the set of test execution channels to generate the combined test execution report.

In one embodiment, the test execution results are collected from all channels and rendered in both detail and aggregate metrics in a test monitoring application and in paginated document form that may be emailed or printed. Furthermore, the reporting module 222 is configured to display per test case information with expected vs actual data, detailed instructions to recreate any defects, screenshots and or video, and execution time. The reporting module 222 may also generate report to demonstrate test progress during the execution and after completion. Furthermore, metrics representing test case count, percentage executed, passed and failed may also be generated by the reporting module 222. The metrics information may be displayed graphically, such as in bar and pie charts, and optionally compared to past run metrics. These metrics may be further computed on a per-channel basis, as well as application area. The expected completion time is computed initially by averaging the most recent runs if available. After a certain threshold of test case completion per channel (ex. ten percent) the average time per test case is multiplied by the remaining test cases of the respective channel. Further, the differentiation of current run vs average of the last five may also be computed. The process of normalizing the test case definitions and performing testing of the software application 112 is further elaborated with respect to FIG. 4.

Figure 4:
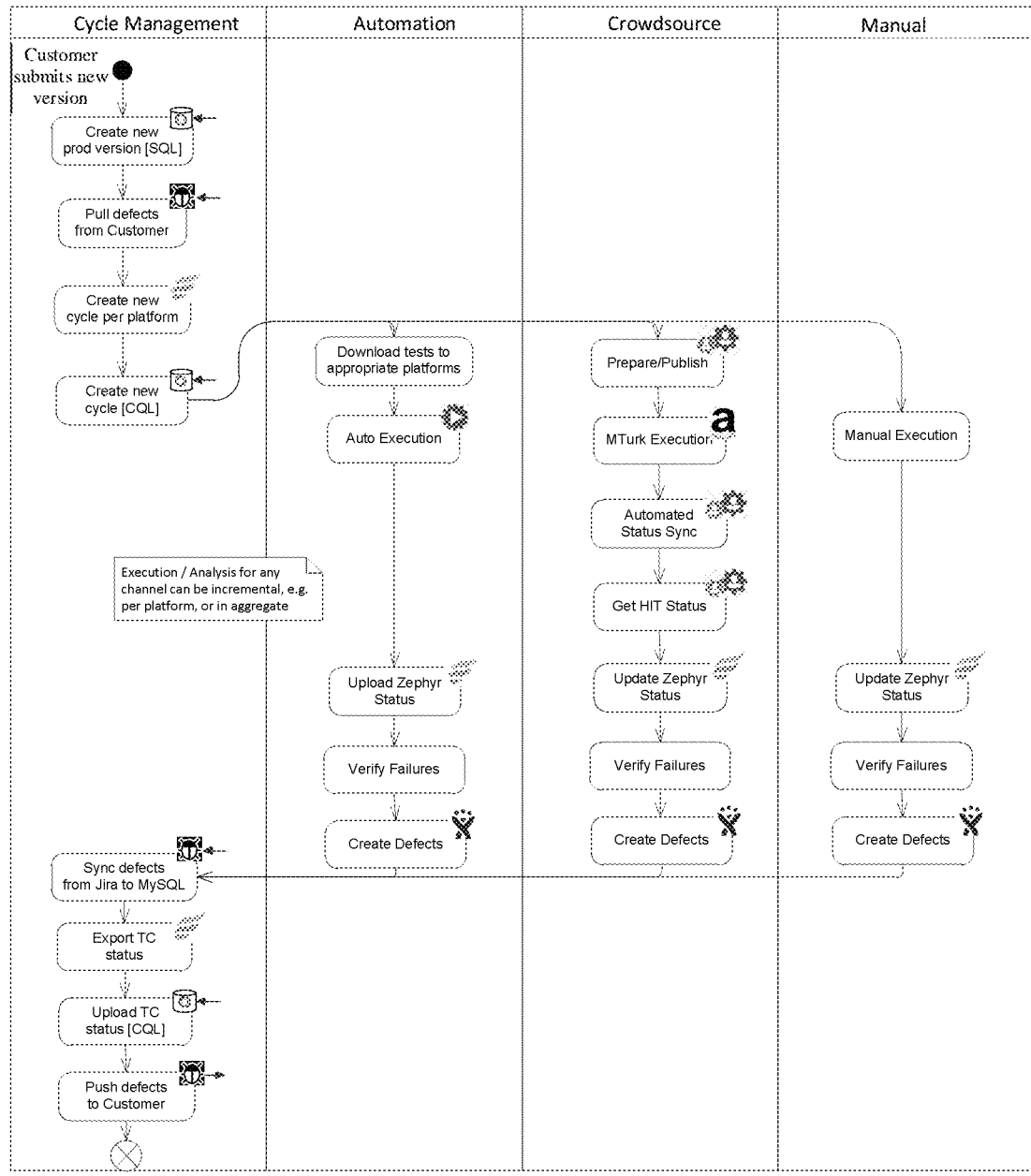
FIG. 4 illustrates an example of testing the software application using the system, in accordance with an embodiment of the present subject matter.

FIG. 4 represents an example of execution the testing the software application 112 using the system 102. In this specific implementation, three test case execution channels namely automated test execution channel, crowdsource execution channel, and manual test case execution channel is used. In the first step, a new version of the software application 112 is received at the system 102. Further, the new version is analyzed and defects may be fetched for the software application. Based on the defects identified, the system is configured to generate a test execution cycle per platform (execution channel) and an overall test execution cycle for the entire software application 112. The Further, test execution cycle per platform may comprise normalized test case definitions associated with the platform. Based on the test case definitions associated with each platform, the testing cycle is executed at each platform and accordingly the results are combined to generate a test execution report. Since the test case definitions are normalized, the test execution results from each test case execution channel can be easily combined to generate a single aggregated report of the test execution cycle.

Although implementations for methods and systems for multi-channel testing have been described in language specific to structural features and/or methods, it is to be understood that the appended claims are not necessarily limited to the specific features or methods described. Rather, the specific features and methods are disclosed as examples of implementations for multi-channel testing.

We claim:

1. A system for multi-channel testing, the system is comprises:
   a memory; and
   a processor configured to execute programmed instructions stored in the memory for:
   generating a set of test case definitions for testing a software application, wherein each test cases definition is compatible with each test execution channel from a set of test execution channels, wherein each test case definition is assigned with a primary execution channel and a secondary execution channel, and wherein the set of test case definitions is generated based on user inputs;
   allocating a sub-set of test case definitions, from the set of test cases definitions, to each test execution channel from the set of test execution channels based on a set of execution parameters specified by a user, and the primary execution channel and the secondary execution channel associated with each test case definition;
   generating a set of test cases corresponding to each of the sub-set of test case definitions based on the test execution channel associated with each on the sub-set of test case definitions;
   performing a test execution cycle to classify the set of test cases into passed test cases and failed test cases based on execution of each set of test cases at the corresponding test case execution channel, wherein the execution of each set of test cases at the corresponding test execution channel is performed in parallel;
   determining a final execution status of the failed test cases by re-executing the failed test cases over one or more test execution channels from the set of test execution channels, wherein the one or more test execution channels are determined based on the primary execution channel and the secondary execution channel associated therewith; and
   generating a combined test execution report based on the test execution cycle and final execution status of the failed test cases, wherein the combined test execution report is generated in real-time, wherein each test execution channel is associated with a standardized reporting methodology, and wherein the standardized reporting methodology enables combining execution results from the set of test execution channels to generate the combined test execution report.

2. The system of claim 1, wherein each test case definition is associated with a set of characteristics, wherein the set of characteristics comprise consistent granularity, communicability, comprehensiveness, transformable from one test execution channel to another, and measurability.

3. The system of claim 1, wherein the set of execution parameters specify one or more preferred test execution channels to be used in order to timely complete the test execution cycle, wherein timely complete the test execution cycle is further enabled by real time monitoring of the test execution cycle to identify one or more hurdles in timely complete the test execution cycle and removing the one or more hurdles by re-execution, restarting infrastructure, republishing, and reward changes.

4. The system of claim 1, wherein a test case definition is assigned to one or more test execution channels, and wherein execution results from the one or more test execution channels is analyzed to classify the test case into passed test case or failed test case, and wherein each test cases definition is associated with a predefined weightage and a predefined size, wherein the predefined weightage and the predefined size are consistent across the set of test execution channels, wherein the predefined weightage and the predefined size is directly proportional to a number of validation points associated with the test cases definition, and wherein the execution results from set of test execution channels are combined using the predefined weightage and the predefined size for each test case definition.

5. The system of claim 1, wherein the test cases are configured to perform one or more software testing activities from a set of software testing activities, wherein the set of software testing activities comprise functional, performance, security, and usability testing of a software application.

6. The system of claim 1, further configured to aggregate or disaggregate the test cases dependent on the set of execution parameters associated with the test execution channels, wherein the set of execution parameters comprise cost, performance, and efficiency of the test execution channel.

7. A method for multi-channel testing, the method comprising:
   generating, by a processor, a set of test case definitions for testing a software application, wherein each test cases definition is compatible with each test execution channel from a set of test execution channels, wherein each test case definition is assigned with a primary execution channel and a secondary execution channel, and wherein the set of test case definitions is generated based on user inputs;
   allocating, by the processor, a sub-set of test case definitions, from the set of test cases definitions, to each test execution channel from the set of test execution channels based on
   a set of execution parameters specified by a user, and the primary execution channel and the secondary execution channel associated with each test case definition;
   generating, by the processor, a set of test cases corresponding to each of the sub-set of test case definitions based on the test execution channel associated with each on the sub-set of test case definitions;
   performing, by the processor, a test execution cycle to classify the set of test cases into passed test cases and failed test cases based on execution of each set of test cases at the corresponding test case execution channel, wherein the execution of each set of test cases at the corresponding test execution channel is performed in parallel;
   determining, by the processor, a final execution status of the failed test cases by re-executing the failed test cases over one or more test execution channels from the set of test execution channels, wherein the one or more test execution channels are determined based on the primary execution channel and the secondary execution channel associated therewith; and
   generating, by the processor, a combined test execution report based on the test execution cycle and final execution status of the failed test cases, wherein the combined test execution report is generated in real-time, wherein each test execution channel is associated with a standardized reporting methodology, and wherein the standardized reporting methodology enables combining execution results from the set of test execution channels to generate the combined test execution report.

8. The method of claim 7, wherein each test case definition is associated with a set of characteristics, wherein the set of characteristics comprise consistent granularity, communicability, comprehensiveness, transformable from one test execution channel to another, and measurability.

9. The method of claim 7, wherein the set of execution parameters specify one or more preferred test execution channels to be used in order to timely complete the test execution cycle, wherein timely complete the test execution cycle is further enabled by real time monitoring of the test execution cycle to identify one or more hurdles in timely complete the test execution cycle and removing the one or more hurdles by re-execution, restarting infrastructure, republishing, and reward changes.

10. The method of claim 7, wherein a test case definition is assigned to one or more test execution channels, and wherein execution results from the one or more test execution channels is analyzed to classify the test case into passed test case or failed test case, and wherein each test cases definition is associated with a predefined weightage and a predefined size, wherein the predefined weightage and the predefined size are consistent across the set of test execution channels, wherein the predefined weightage and the predefined size is directly proportional to a number of validation points associated with the test cases definition, and wherein the execution results from set of test execution channels are combined using the predefined weightage and the predefined size for each test case definition.

11. The method of claim 7, wherein the test cases are configured to perform one or more software testing activities from a set of software testing activities, wherein the set of software testing activities comprise functional, performance, security, and usability testing of a software application.

12. The method of claim 7, further comprising steps for aggregating or disaggregating the test cases dependent on the set of execution parameters associated with the test execution channels, wherein the set of execution parameters comprise cost, performance, and efficiency of the test execution channel.

13. A non-transitory program product having embodied thereon a program for multi-channel testing of a software application, the program product further storing instructions for:

generating a set of test case definitions for testing a software application, wherein each test cases definition is compatible with each test execution channel from a set of test execution channels, wherein each test case definition is assigned with a primary execution channel and a secondary execution channel, and wherein the set of test case definitions is generated based on user inputs;

allocating a sub-set of test case definitions, from the set of test cases definitions, to each test execution channel from the set of test execution channels based on
   a set of execution parameters specified by a user, and
   the primary execution channel and the secondary execution channel associated with each test case definition;

generating a set of test cases corresponding to each of the sub-set of test case definitions based on the test execution channel associated with each on the sub-set of test case definitions;

performing a test execution cycle to classify the set of test cases into passed test cases and failed test cases based on execution of each set of test cases at the corresponding test case execution channel, wherein the execution of each set of test cases at the corresponding test execution channel is performed in parallel;

determining a final execution status of the failed test cases by re-executing the failed test cases over one or more test execution channels from the set of test execution channels, wherein the one or more test execution channels are determined based on the primary execution channel and the secondary execution channel associated therewith; and generating a combined test execution report based on the test execution cycle and final execution status of the failed test cases, wherein the combined test execution report is generated in real-time, wherein each test execution channel is associated with a standardized reporting methodology, and wherein the standardized reporting methodology enables combining execution results from the set of test execution channels to generate the combined test execution report.

* * * * *